US010084670B2

United States Patent
Astigarraga et al.

(10) Patent No.: US 10,084,670 B2
(45) Date of Patent: Sep. 25, 2018

(54) NETWORK NODE ON-DEMAND LINK RESOURCES

(71) Applicant: INTERNATIONAL BUSINESS MACHINES CORPORATION, Armonk, NY (US)

(72) Inventors: Tara Astigarraga, Fairport, NY (US); Christopher V. DeRobertis, Hopewell Junction, NY (US); Louie A. Dickens, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 14/656,203

(22) Filed: Mar. 12, 2015

(65) Prior Publication Data

US 2016/0269250 A1    Sep. 15, 2016

(51) Int. Cl.
| | |
|---|---|
| *H04L 12/24* | (2006.01) |
| *H04L 12/911* | (2013.01) |
| *H04L 12/923* | (2013.01) |
| *H04L 12/26* | (2006.01) |

(52) U.S. Cl.
CPC ...... *H04L 41/5054* (2013.01); *H04L 41/0803* (2013.01); *H04L 47/762* (2013.01); *H04L 47/82* (2013.01); *H04L 43/0823* (2013.01)

(58) Field of Classification Search
CPC ... H04L 41/5054; H04L 47/82; H04L 47/762; H04L 43/0823; H04L 41/0803
See application file for complete search history.

(56) References Cited

U.S. PATENT DOCUMENTS

| | | | |
|---|---|---|---|
| 2007/0201380 A1* | 8/2007 | Ma | H04L 45/00 370/254 |
| 2011/0274114 A1 | 11/2011 | Dhar et al. | |
| 2013/0315097 A1 | 11/2013 | Yang et al. | |
| 2015/0271104 A1* | 9/2015 | Chikkamath | H04L 12/4633 370/401 |

FOREIGN PATENT DOCUMENTS

WO    2013143487 A1    10/2013

OTHER PUBLICATIONS

Internet Society RFCS et al.; "Cabletron's VlanHello Protocol Specification Version 4"; An IP.com Prior Art Database Technical Disclosure; http://ip.com/IPCOM/000003229; Sep. 13, 2000.

(Continued)

*Primary Examiner* — Kim T Nguyen
(74) *Attorney, Agent, or Firm* — ZIP Group PLLC (57) ABSTRACT

A switch manager places one or more of the ports into an on-demand pool and are given a default standby state so that the ports are not utilized in normal network switch operation. The manager monitors switch operation conditions for an on-demand resource allocation event that causes the manager to allocate a port from the on-demand pool and configure the port in compliance with an operating configuration so that the newly allocated port may be utilized by the network node. The manager sets a network node status indicating that on-demand pool resources are being utilized and monitors for an operational configuration reduction event that causes the manager to return the port to the on-demand pool.

18 Claims, 4 Drawing Sheets

(56) References Cited

OTHER PUBLICATIONS

Lippitt, M. et al.; "Fibre Channel over Ethernet (FCoE) Data Center Bridging (DCB) Concepts and P:rotocols"; EMC Corporation; https://support.enic.com; 2014.

Hu, L.; "A Comparison of Single Logical Link and Multiple Link Structures in FC-BB"; Vixel Corporation; ANSI T11, FC-BB, Rochester, MN.; lhu@vixel.com; Aug. 1999.

Hewlett-Packard Development Company; "HP Virtual Connect Traffic Flow—Technology Brief"; Hewlett-Packard; TechCom@HP.com or http://twitter.com/ISSGeekatHP; 2011.

* cited by examiner

NETWORK NODE ON-DEMAND LINK RESOURCES

FIELD OF THE INVENTION

Embodiments of the invention generally relate to computer network systems and more particularly to on-demand link resources of a network node.

DESCRIPTION OF THE RELATED ART

Focus is increasingly being placed on on-demand environments, cloud and software defined networking. Such technologies are emerging quickly, but still have strong dependencies on underlying static network node hardware, such as cabling and associated port resources.

Currently there is a lack of on-demand hardware capabilities associated with network node switch links, including but not limited to inter switch links (ISLs), Fibre Channel over IP (FCIP) links, transparent interconnection of lots of links (TRILL), etc. These technologies generally lack on-demand/self-configuring/software defined capabilities and require administrators to cable the links, configure the links for the given operating environment, and enable/disable the links at the appropriate times. For example, if there is an operational peak or a link is lost, an administrator generally is needed to manually and reactively address the issues.

SUMMARY

In an embodiment of the present invention, a method of managing network switch link resources includes designating a port as within an on-demand pool, the on-demand pool comprising a standby state indicating the port as not functional, querying an operation configuration locally stored within the network switch and received by a network node communicatively coupled to the network switch, removing the port from the on-demand pool and configuring the port as an functional port in compliance with the operation configuration, utilizing the port to transmit or receive network data, and designating the port to the on-demand pool.

In another embodiment of the present invention, a computer program product for managing network switch link resources includes a computer readable storage medium having program instructions embodied therewith, the program instructions readable by a network switch to cause the switch to designate a port as within an on-demand pool, the on-demand pool comprising a standby state indicating the port as not functional, query an operation configuration locally stored within the network switch and received by a network node communicatively coupled to the network switch, remove the port from the on-demand pool and configuring the port as an functional port in compliance with the operation configuration, utilize the port to transmit or receive network data, and designate the port to the on-demand pool.

In yet another embodiment of the present invention, a network switch includes a plurality of ports for the transmission and for the receipt of network data, a first plurality of ports being in an operational pool and a second plurality of ports being in an on-demand pool, the on-demand pool comprising a standby state indicating the port as not functional, a memory that stores an operation configuration received by a network node communicatively coupled to the network switch, and a manager that removes a port from the on-demand pool and configures the port as an functional port in compliance with the operation configuration.

These and other embodiments, features, aspects, and advantages will become better understood with reference to the following description, appended claims, and accompanying drawings.

DETAILED DESCRIPTION

Embodiments of the invention generally relate to managing on-demand link resources of a first network node including a plurality of ports communicatively connected to respective ports of other network nodes by a cable. A local manager of the first network node places one or more of the ports into an on-demand pool are given a default standby state so that the ports are not utilized in normal network node operation. The manager monitors operation conditions of the network node for an on-demand resource allocation event that causes the manager to allocate a port from the on-demand pool into an operating configuration so that the newly allocated port may be utilized by the network node. The manager sets a network node status indicating that on-demand pool resources are being utilized and monitors for an operational configuration reduction event that causes the manager to return the port to the on-demand pool.

Figure 1:
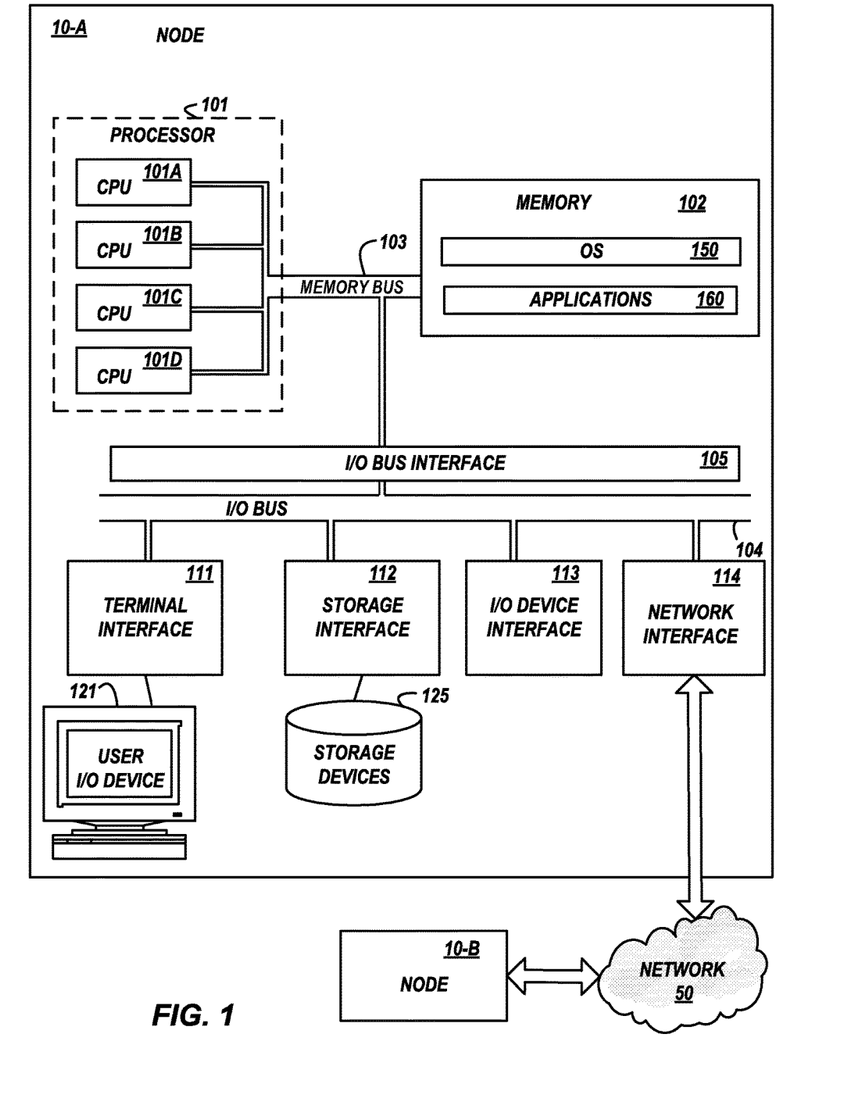
FIG. 1 illustrates a high-level block diagram of an exemplary network system for implementing various embodiments of the invention.

Referring to the FIGs., wherein like numbers denote like parts throughout the several views, FIG. 1 depicts a high-level block diagram representation of a network node 10-A connected to another network node 10-B via a network 50, according to an embodiment of the present invention. The term "node" is used herein for convenience only, and in various embodiments is a more general discrete data handling system, such as a mobile phone, tablet, server computer, network switch, etc. The mechanisms and apparatus of embodiments of the present invention apply equally to any appropriate data handling system.

The major components of the node 10-A may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The node 10-A contains one or more general-purpose programmable central processing units (CPUs) 101A, 101B, 101C, and 101D, herein generically referred to as the processor 101. In an embodiment, the node 10-A contains multiple processors typical of a relatively large system; however, in another embodiment the node 10-A may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the node 10-A, and may also include the virtual memory of other computer systems coupled to the node 10-A or connected via the network 50. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, applications 160, etc. are illustrated as being contained within the memory 102 in the node 10-A, in other embodiments some or all of them may be on different nodes and may be accessed remotely, e.g., via the network 50. The node 10-A may use virtual addressing mechanisms that allow the programs of the node 10-A to behave as if they only have access to a large, single storage entity instead of access to multiple, smaller storage entities. Thus, while operating system 150, application 160, or other program instructions are illustrated as being contained within the main memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGs. When such program instructions are able to be run by the processor 101, such computer becomes a particular machine configured to carry out such instructions. For example, an application may monitor the utilization of node resources, such as the processor 101.

In some embodiments, one or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image may be displayed to a user. The processor 101 and GPU may be discrete components or may be integrated into a single component.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the node 10-A, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.).

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device such as solid state drives (SSDs) or optical disk drives. The contents of the main memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

The I/O device interface 113 provides an interface to any of various other input/output devices. The network adapter 114 provides one or more communications paths from the node 10-A to other data handling devices such as numerous other computers; such paths may comprise, e.g., one or more networks 50.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the node 10-A may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol on another bus. Therefore, network interface 114 may connect a wide variety of devices to node 10-A and to each other such as, but not limited to, tape drives, a SAN network (e.g. switches, storage systems, etc.), optical drives, printers, disk controllers, other bus adapters, PCI adapters, workstations using one or more protocols including, but not limited to, Token Ring, Gigabit Ethernet (GbEN), Ethernet, Fibre Channel, Fibre Channel over Ethernet (FCoE), SSA, Fiber Channel Arbitrated Loop (FCAL), Serial SCSI, Ultra3 SCSI, iSCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the node 10-A is a multi-user mainframe computer system, a single-user system, a server computer, storage system, or similar device that has little or no direct user interface, but receives requests from other computer systems (clients). In other embodiments, the node 10-A is implemented as a desktop computer, portable computer, laptop or notebook computer, tablet computer, pocket computer, telephone, smart phone, pager, automobile, teleconferencing system, appliance, or any other appropriate type of electronic device. In other embodiments, the node 10-A is implemented as network switch, router, or other networking device. In such embodiments, one or more of the components of node 10-A shown in FIG. 1 may not be included therein.

In embodiments, network 50 may be one or more suitable networks or combination of networks and may support any appropriate protocol suitable for communication of data and/or code to/from the node 10-A and at least the node 10-B. For example, network 50 may include a communication network (e.g., internet) and network 50 may include a storage network (e.g., SAN). In various embodiments, the network 50 may represent a data handling device or a combination of data handling devices, either connected directly or indirectly to the node 10-A. In another embodiment, the network 50 may support wireless communications. In another embodiment, the network 50 may support hardwired communications, such as a telephone line or cable. In another embodiment, the network 50 may be the Internet and may support IP (Internet Protocol). In another embodiment, the network 50 is implemented as a local area network (LAN) or a wide area network (WAN). In another embodiment, the network 50 is implemented as a hotspot service provider network. In another embodiment, the network 50 is implemented an intranet. In another embodiment, the network 50 is implemented as any appropriate cellular data network, cell-based radio network technology, or wireless network. In another embodiment, the network 50 is implemented as any suitable network or combination of networks. Although one network 50 is shown, in other embodiments any number of networks (of the same or different types) may be present.

FIG. 1 is intended to depict the representative major components of the node 10-A. But, individual components may have greater or lesser complexity than represented in FIG. 1, components less than, other than, or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon node 10 according to various embodiments of the invention may be implemented in a number of manners, including using various computer applications, routines, components, programs, objects, modules, data structures, etc. Node 10-B may include similar, less, or additional components as compared with node 10-A. In specific embodiment, node 10-A may be a server and node 10-B may be network switch.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
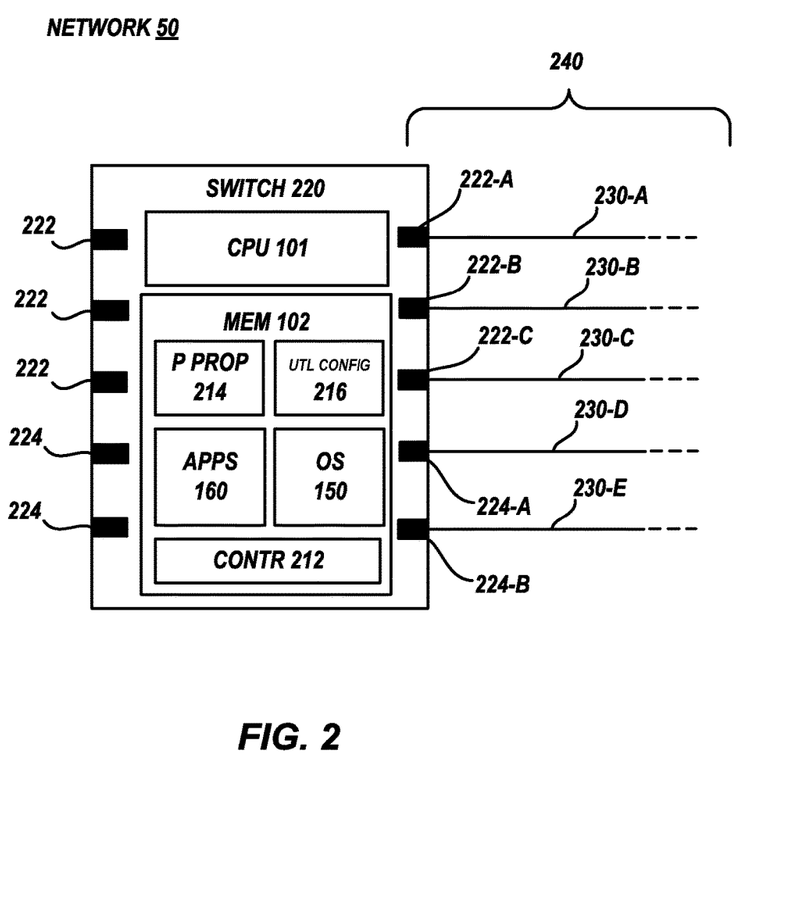
FIG. 2 illustrates an exemplary network node, according to various embodiments of the present invention.

FIG. 2 illustrates a network switch 220, according to various embodiments of the present invention. Network switch 220 is a particular node 10 communicatively connected to other nodes 10 by network 50. Switch 220 exemplarily includes a processor 101 and memory 102 and may include one or more other similar components to node 10-A, as depicted in FIG. 1. Switch 220 includes one or more ports 222 and includes one or more ports 224. The differences between ports 222 and ports 224 are described further. Switch 220 may also include one or more applications 160 and an operating system 150.

Switch 220 also includes a controller 212, port property designation 214, and a utilization configuration 216. Controller 212 may be particular program instructions of a particular application 160 or program instructions distributed across multiple applications that may be called by processor 101. The combination of processor 101 and called controller 212 program instructions are herein referred to as the switch 220 manager. Port property designation 214 is an indication or designation assigned by the switch 220 manager to each port of switch 220.

Port property designation 214 is a binary indication per each port of switch 220. The particular port property designation 214 assigns the port to a particular utilization state. For example, an active port property designation 214 may assign the associated port to a utilization pool to indicate that the port is utilized by the switch 220 in normal operation. An inactive port property designation 214 may assign the associated port 224 to an on-demand pool to indicate that the port is idle during normal operation of switch 220 but may be utilized by the switch 220 as is described further herein. For clarity, the logical inverse of the exemplary port property designation 214 is possible in that the active designation 214 assigns the port to the on-demand pool and the inactive designation 214 assigns the port to the utilization pool. In embodiments, the switch ports may be assigned a designation 214 by default that may be subsequently modified by switch 220 manager. In a particular embodiment, a network 50 administrator may assign the designation 214 per port by modifying controller 212 program instructions via e.g., device 121, etc.

Ports 222 are switch 220 ports that the switch 220 manager has assigned to the utilization pool and ports 224 are switch 220 ports that the switch 220 manager has assigned to the on-demand pool. Each port of switch 220 may be connected to another node 10 port via a cable 230. For example, port 222-A may be connected to a node 10 port by cable 230-A, port 222-B may be connected to the same or different node 10 (e.g. a second switch 220, etc.) port by cable 230-B, port 222-C may be connected to the same or different node 10 port by cable 230-C, port 224-A may be connected to the same or different node 10 port by cable 230-D, and port 224-B may be connected to the same or different node 10 port by cable 230-E.

The combination of ports 222, 224 and connected cables 230 that connect the associated port to another node 10 (e.g., another switch 220, etc.) form the hardware portion of switch links 240. Links 240 also include an operational protocol assigned by switch 220 manager to match utilization configuration 216. For example, switch link 240 may operate as ISLs, FCIP links, TRILL links, Fabric Path links, Fibre Channel over Ethernet (FCoE) links, etc. Switch 220 manager may assign a particular operational protocol to links 240. For example, the switch 220 manager may assign links 240 to operate under the ISL protocol. As such, ports 222, 224 are link ready and configurable by switch 220 manager. For example, if the manager assigns links 240 to operate under the TRILL protocol, the manager configures ports 222, 224 to operate as TRILL ports.

Utilization configuration 216 is the operating configuration of the particular switch 220 defined by centralized program instructions (CPI) stored upon a cloud node 10 that control the behavior of network 50 (e.g. software defined networking, cloud defined networking, etc.). The CIP may separate network 50 control logic from the underlying physical nodes 10 (i.e., routers, switches) that forward traffic to allow network 50 administrators implement high-level control programs that specify the behavior the network 50, in contrast to conventional networks, whereby network operators codify functionality in terms of local low-level device configurations. By utilizing CPI it is possible for network 50 administrators to specify more complex tasks that involve integrating many disjoint network functions (e.g., security, resource control, and prioritization, etc.) into a single control framework, to create more sophisticated policies, and to make network configurations easier to configure, manage, troubleshoot, and debug.

Figure 3:
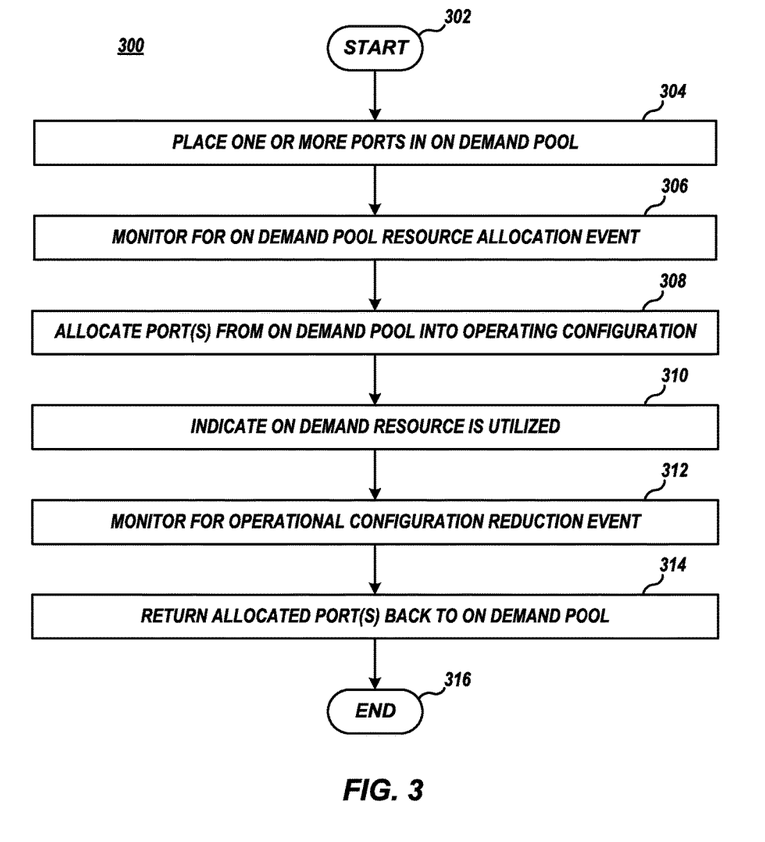
FIG. 3 illustrates an exemplary process for managing on-demand network node link resources, according to various embodiments of the present invention.

FIG. 3 illustrates an exemplary method 300 for managing on-demand network node 10 link 240 resources, according to various embodiments of the present invention. Method 300 may be utilized by switch 220 in a network 50. Method 300 begins at block 302 and continues by the node 10 placing one or more cable 230 connected ports 224 into an on-demand pool (block 304). For example, the switch 220 manager may modify an associated port property 214 such as a making an entry in the port-type field, by making an entry in port settings, etc. that indicate a particular switch 220 port is an on-demand port 224. Such modification of applicable port properties 214, e.g., places ports 224-A and 224-B into the on-demand resource pool such that the port 224 is idle during normal operation of switch 220 but may be may be moved into and out of operations by the switch 220 manager.

Method 300 may continue by the switch 220 monitoring for an on-demand pool resource allocation event (block 306). For example, an application 160 may monitor utilization of links 240 to determine whether the utilization rate exceeds a threshold. The threshold may be, for example, a 70% utilization of links 240. Other exemplary allocation events may be whether an error condition occurs on a port 222, whether utilization configuration 216 specifies a number of ports 222 that are to be operational that exceeds a threshold (e.g., number of ports exceed a login threshold, etc.), etc.

Method 300 may continue by the switch 220 allocating ports 224 within the on-demand pool into an operating configuration mirroring utilization configuration 216 (block 308). For example, the switch manager may query utilization configuration 216 that is in need of link(s) 240 associated with a port 224 and then configures the port 224 to match the configuration 216. The switch 220 may then place the on-demand port 224 into operation. For example, once the manager configures the port 224 to match the configuration 216, the new allocated link 230 may be added into the port-channel/trunk, etc.

Method 300 may continue by the switch 220 indicating that it is utilizing an on-demand resource (block 310). For example, the switch 220 manager may notify the node 10 hosting the CPI that defines configuration 216, or other nodes 10, that the switch 220 is utilizing an on-demand port 224. The switch 220 manager may also transmit, with the notification, information relevant to the resource allocation event specifying rationales of the allocation of port 224 into operation.

Method 300 may continue by the switch 220 monitoring for an operational configuration reduction event (block 312). For example, the application 160 that monitors utilization of links 240 may determine whether the utilization rate is less than a threshold. The threshold may be, for example, a 70% utilization of links 240. Other exemplary reduction events may be a resolution of the error condition on a port 222, the utilization configuration 216 specifies a number of ports 222 that are to be operational that moves less than the threshold (e.g., number of ports is less than a login threshold, etc.), etc. Another exemplary reduction event may be the expiration of a designated time period.

Method 300 may continue by the switch 220 retuning the allocated port 224 back to the on-demand pool. The switch 220 may determine that the on-demand port 224 is no longer needed (e.g., the resource allocation event triggering the allocation of port 224 into operation has ceased, etc.). In an embodiment, where the resource allocation even was a port 222 error, the port 222 that caused the error condition may be placed in the on-demand pool becoming a port 224 with the manager further indicating that the associated link should not be put back into service or future on-demand additions until it is reviewed by an administrator and potentially replaced, fixed, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
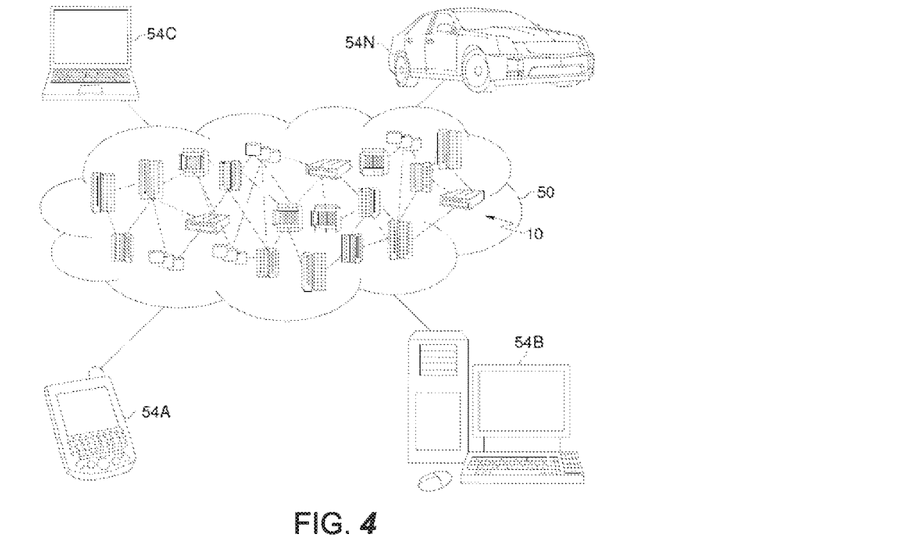
FIG. 4 depicts a cloud computing environment according to an embodiment of the present invention.

Referring now to FIG. 4, illustrative cloud computing environment/network 50 is depicted. As shown, cloud computing environment/network 50 comprises one or more cloud computing nodes 10 with which local computing devices used by cloud consumers, such as, for example, personal digital assistant (PDA) or cellular telephone, desktop computer, laptop computer, and/or automobile computer system may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment/network 50 to offer infrastructure, platforms and/or software as services for which a cloud consumer does not need to maintain resources on a local computing device. It is understood that the types of computing devices shown in FIG. 2 are intended to be illustrative only and that computing nodes 10 and cloud computing environment/ network 50 can communicate with any type of computerized device over any type of network and/or network addressable connection (e.g., using a web browser).

Figure 5:
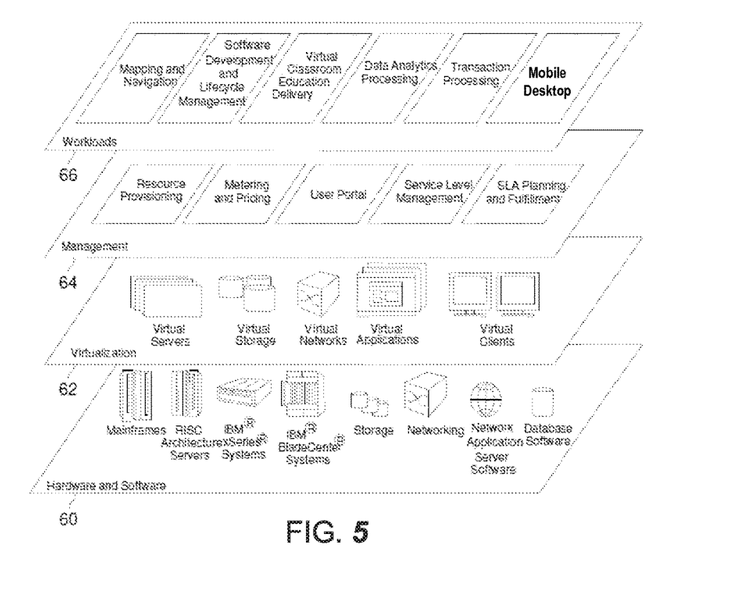
FIG. 5 depicts abstraction model layers according to an embodiment of the present invention.

Referring now to FIG. 5, a set of functional abstraction layers provided by cloud computing environment/network 50 (FIG. 2) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; storage devices; networks and networking components. Examples of software components include network application server software, in one example IBM WebSphere® application server software; and database software, in one example IBM DB2® database software. (IBM, zSeries, pSeries, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of managing network switch link resources of a network switch within a network, the method comprising:
designating, with the network switch, a port as within an on-demand pool, the on-demand pool comprising a standby state indicating the port as not functional;
querying, with the network switch, an operation configuration locally stored within the network switch and received by a network node communicatively coupled to the network switch, wherein the operation configuration controls network switch operations within the network as indicated by centralized program instructions (CPI) stored within the network node, the operation configuration comprising a network protocol that is assigned to the port by the CPI;
removing, with the network switch, the port from the on-demand pool and configuring the port as functional in compliance with the assigned network protocol as indicated by the operation configuration;
utilizing, with the network switch, the port to transmit or receive network data;
notifying the network node, with the network switch, that the network switch is utilizing the port; and
designating, with the network switch, the port back to the on-demand pool.

2. The method of claim 1, further comprising:
designating, with the network switch, a plurality of ports as within an operational pool, the operational pool comprising an active state indicating the plurality of ports as functional.

3. The method of claim 2, wherein removing the port from the on-demand pool is triggered by a rationale of a utilization rate of the plurality of ports within the operational pool exceeds a threshold.

4. The method of claim 2, wherein removing the port from the on-demand pool is triggered by a rationale of an error condition of a port within the operational pool.

5. The method of claim 4, wherein the port remains functional and wherein the port having the error condition is designated to the on-demand pool.

6. The method of claim 5, further comprising:
flagging, with the network switch, the port having the error condition within the on-demand pool as needing service.

7. The method of claim 3 or 4, wherein notifying the network node further comprises:
transmitting to the network node, with the network switch, the rationale that triggered the port being removed from the on-demand pool.

8. The method of claim 1, wherein designating, the port as within the on-demand pool further comprises:
modifying, with the network switch, a port type field associated with the port.

9. The method of claim 1, wherein designating, the port as within the on-demand pool further comprises:
modifying, with the network switch, a port setting associated with the port.

10. A computer program product for managing network switch link resources of a network switch within a network, the computer program product comprising a computer readable storage medium having program instructions embodied therewith, the program instructions readable by the network switch to cause the network switch to:
designate a port as within an on-demand pool, the on-demand pool comprising a standby state indicating the port as not functional;
query an operation configuration locally stored within the network switch and received by a network node communicatively coupled to the network switch, wherein the operation configuration controls network switch operations within the network as indicated by centralized program instructions (CPI) stored within the network node, the operation configuration comprising a network protocol that is assigned to the port by the CPI;
remove the port from the on-demand pool and configuring the port as functional in compliance with the assigned network protocol as indicated by the operation configuration;
utilize the port to transmit or receive network data;
notify the network node that the network switch is utilizing the port; and
designate the port back to the on-demand pool.

11. The computer program product of claim 10, wherein the program instructions further cause the network switch to:
designate a plurality of ports as within an operational pool, the operational pool comprising an active state indicating the plurality of ports as functional.

12. The computer program product of claim 11, wherein the program instructions that cause the network switch to remove the port from the on-demand pool are triggered by a rationale of a utilization rate of the plurality of ports within the operational pool exceeding a threshold.

13. The computer program product of claim 11, wherein the program instructions that cause the network switch to remove the port from the on-demand pool are triggered by a rationale of an error condition of a port within the operational pool.

14. The computer program product of claim 13, wherein the port remains functional and wherein the port having the error condition is designated to the on-demand pool.

15. The computer program product of claim 14, wherein the program instructions further cause the network switch to:
flag the port having the error condition within the on-demand pool as needing service.

16. The computer program product of claim 12 or 13, wherein the program instructions that cause the network switch to notify the network node that the network switch is utilizing the port, further causes the network switch to:
transmit to the network node the rationale that triggered the port being removed from the on-demand pool.

17. The computer program product of claim 10, wherein program instructions that designate the port as within the on-demand pool further causes the network switch to:
modify a port type field associated with the port.

18. A network switch within a network comprising:
a plurality of ports for transmission and for receipt of network data, a first plurality of ports being in an operational pool and a second plurality of ports being in an on-demand pool, the on-demand pool comprising a standby state indicating the second plurality of ports as not functional;
a memory that stores an operation configuration received by a network node communicatively coupled to the network switch, wherein the operation configuration controls network switch operations within the network as indicated by centralized program instructions (CPI) stored within the network node, the operation configuration comprising a respective network protocol that is assigned to each of the first plurality of ports and to each of the second plurality of ports by the CPI; and
a manager that removes a port from the on-demand pool, configures the port as functional in compliance with the assigned network protocol as indicated by the operation configuration, designates the port to the operational pool, notifies the network node that the network switch is utilizing the port, and subsequently designates the port back to the on-demand pool.

* * * * *